(12) United States Patent
Reber

(10) Patent No.: US 11,444,408 B2
(45) Date of Patent: Sep. 13, 2022

(54) SHIELDED CONNECTORS FOR DOCKED MOBILE DEVICES

(71) Applicant: ZEBRA TECHNOLOGIES CORPORATION, Lincolnshire, IL (US)

(72) Inventor: David William Reber, Cedar Park, TX (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/163,897

(22) Filed: Feb. 1, 2021

(65) Prior Publication Data
US 2022/0247115 A1 Aug. 4, 2022

(51) Int. Cl.
*H01R 13/52* (2006.01)

(52) U.S. Cl.
CPC ....... *H01R 13/5202* (2013.01); *H01R 13/521* (2013.01); *H01R 13/5208* (2013.01); *H01R 13/5216* (2013.01)

(58) Field of Classification Search
CPC ............ H01R 13/5202; H01R 13/5208; H01R 13/521; H01R 13/5216; H01R 13/6599
See application file for complete search history.

(56) References Cited

U.S. PATENT DOCUMENTS

| | | | | |
|---|---|---|---|---|
| 3,744,128 A * | 7/1973 | Fisher | ................ | H01R 13/6599 29/858 |
| 7,329,150 B2 * | 2/2008 | Ju | ........................ | H01R 12/716 439/607.11 |
| 10,320,101 B2 * | 6/2019 | Brogan | ................. | G06F 1/1637 |
| 10,658,793 B2 * | 5/2020 | Blake | .................... | H01R 13/64 |
| 2012/0021631 A1 * | 1/2012 | Yi | ..................... | H01R 13/6599 439/271 |
| 2018/0151978 A1 * | 5/2018 | Zhao | .................. | H01R 13/6587 |

OTHER PUBLICATIONS

"VT Miltope RTCS-2 Rugged Tablet Computer System". Retrieved from the Internet on Jan. 29, 2021. [https://www.ruggedpcreview.com/3_slates_vtmiltope_rtcs2.html].

* cited by examiner

*Primary Examiner* — Tho D Ta

(57) ABSTRACT

A connector includes: a connector body having an outer end and an opposing inner end, the connector body supported by a housing of a first device, wherein the outer end is exposed to an exterior of the housing and the inner end is placed within an interior of the housing; a signal conductor extending between the inner end and the outer end to engage with a complementary connector of a second device; a conductive resiliently deformable sleeve extending between the inner end and the outer end of the connector body, wherein the conductive resiliently deformable sleeve: (i) defines an electrically isolating shield that substantially encloses the signal conductor from the inner end to the outer end, and (ii) forms a seal against the second device encircling the signal conductor and the complementary connector.

19 Claims, 12 Drawing Sheets

SHIELDED CONNECTORS FOR DOCKED MOBILE DEVICES

BACKGROUND

Mobile devices can be affixed to a dock, e.g. to support the device for use by an operator of other equipment such as a truck or other vehicle. The dock may also provide power and/or data connectivity to the mobile device. Such mobile devices and associated docks can be deployed in a wide variety of environments, some of which may expose the mobile device to environmental factors such as dust, moisture, and the like. Physical connections between a mobile device and a dock, e.g. to supply power to the device and/or provide communications capabilities between the device and the dock, can be sources of either or both of environmental contamination (e.g. dust and/or water ingress) and electrical noise.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
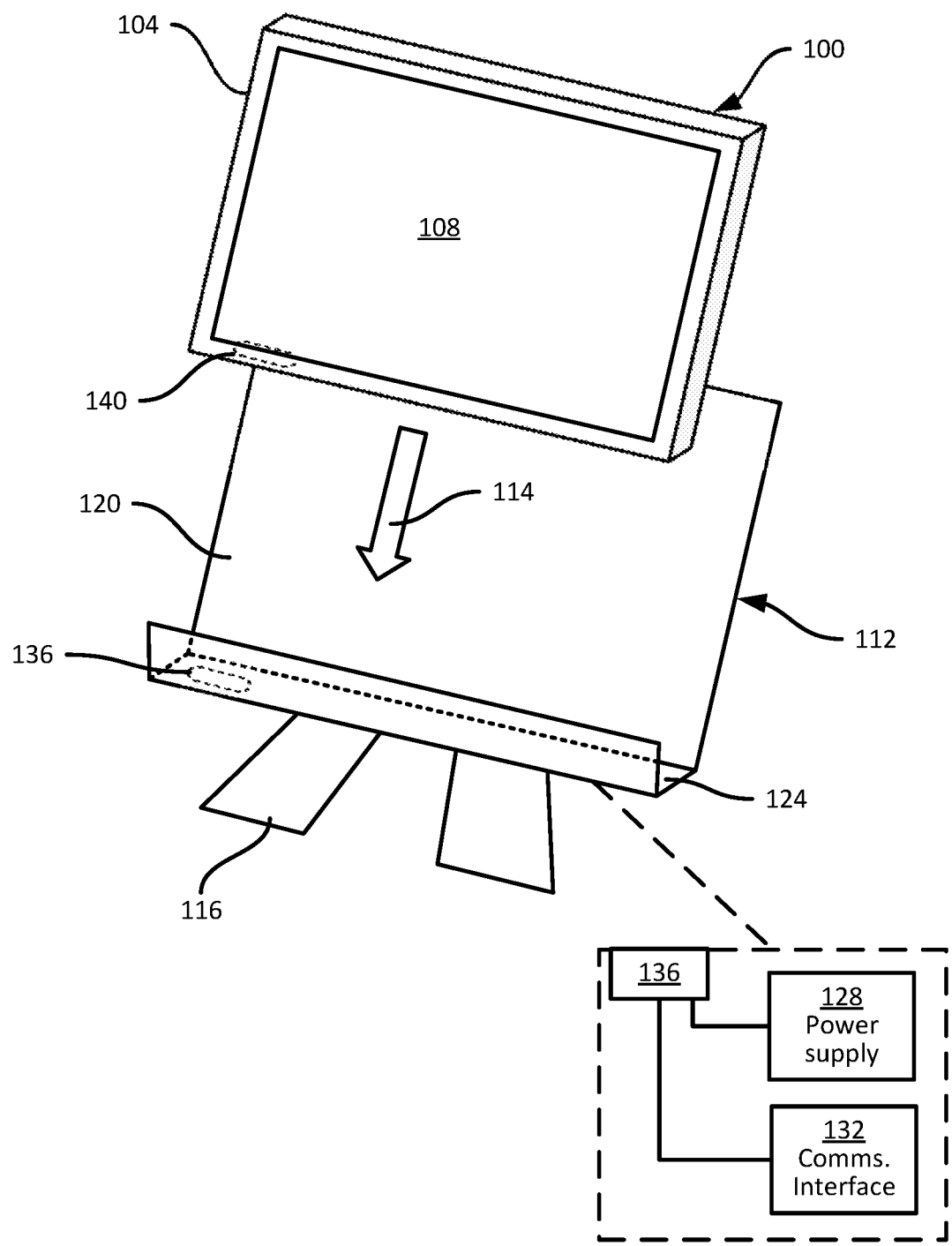
FIG. 1 is a diagram of a mobile device and a dock for the mobile device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a connector including: a connector body having an outer end and an opposing inner end, the connector body supported by a housing of a first device, wherein the outer end is exposed to an exterior of the housing and the inner end is placed within an interior of the housing; a signal conductor extending between the inner end and the outer end to engage with a complementary connector of a second device; a conductive resiliently deformable sleeve extending between the inner end and the outer end of the connector body, wherein the conductive resiliently deformable sleeve: (i) defines an electrically isolating shield that substantially encloses the signal conductor from the inner end to the outer end, and (ii) forms a seal against the second device encircling the signal conductor and the complementary connector.

Additional examples disclosed herein are directed to a dock for a mobile device including: a housing configured to support the mobile device, and having an engagement surface to engage with an outer surface of the mobile device; a connector disposed on the engagement surface, the connector including: a connector body having an outer end and an opposing inner end, the connector body supported by the housing, wherein the outer end is exposed to an exterior of the housing and the inner end is placed within an interior of the housing; a signal conductor extending between the inner end and the outer end to engage with a complementary connector of the mobile device supported by the dock; a conductive resiliently deformable sleeve extending between the inner end and the outer end of the connector body, wherein the conductive resiliently deformable sleeve: (i) defines an electrically isolating shield that substantially encloses the signal conductor from the inner end to the outer end, and (ii) forms a seal against the mobile device encircling the signal conductor and the complementary connector.

Further examples disclosed herein are directed to a method of manufacturing a connector, including: in a first molding operation, fabricating a connector body of a first material and having an outer end and an opposing inner end, the connector body configured for support by a housing of a first device to (i) expose the outer end to an exterior of the housing, and (ii) place the inner end within an interior of the housing; in a second molding operation, overmolding the connector body with a conductive, resiliently deformable sleeve extending between the inner end and the outer end of the connector body; and installing a signal conductor in the connector body, the signal conductor extending between the inner end and the outer end, and substantially enclosed within an electrically isolating shield formed by the sleeve.

FIG. 1 illustrates a mobile device 100, such as a tablet computer, laptop computer or the like, including a housing 104 supporting various other components of the device 100, including a display 108 and internal components such as processing and storage hardware, and the like. FIG. 1 also illustrates a dock 112, configured to support the mobile device 100 when the mobile device 100 is placed on the dock, e.g. as indicated by the arrow 114. The dock 112 can include a stand 116, e.g. for placement on a desk or the like. In other examples, the dock 112 can be mounted in a vehicle such as a truck, a forklift, or the like. In further examples, the dock can be wall-mounted rather than stand-mounted.

In general, as will be apparent to those skilled in the art, the dock 112 enables support of the mobile device 100 in a location where the mobile device 100 remains accessible by an operator, e.g. when the operator is also operating other equipment or engaged in other tasks. The dock 112 may implement any of a wide variety of retaining mechanisms to releasably secure the mobile device 100 thereto.

In addition to providing physical support for the mobile device 100, the dock 112 can provide at least one of communications capabilities and power to the mobile device 100, while the device 100 is affixed to the dock 112. For example, the dock 112 includes a housing 120 that, in addition to defining at least one support surface 124 (which may also be referred to as an engagement surface, as it is configured to engage with an outer surface of the device 100) upon or against which the device 100 rests when affixed to the dock 112, contains certain internal components. The internal components include, in this example, a power supply 128 and a communications interface 132.

The power supply 128 may draw electrical power from an external source such as the power plant of a vehicle, an electric mains, or the like. The power supply 128 may further supply electrical power to other internal components of the dock 112 (including the communications interface 132), and to the device 100. The communications interface 132 can be configured to connect to a local or wide-area network, and may include a wired network port, a connection to a wireless transceiver, or the like. In some examples, the communications interface 132 itself can include such a transceiver.

When the device 100 is affixed to the dock 112, the power supply 128 can provide electrical power to the device 100, e.g. to charge a battery thereof. Further, although the device 100 generally includes an internal communications interface, the dock 112 may also enable the device 100 to communicate with other computing devices via the communications interface 132. In some cases (e.g. in the cab of a truck), the performance of a wireless transceiver of the device 100 may be reduced by proximity conductive structures such as a vehicle body.

To provide power and/or communications functions to the device 100, the dock 112 includes a connector 136, e.g. disposed on the support surface 124 and connected, internally to the housing, with one or both of the power supply 128 and the communications interface 132. In other examples, the dock 112 can include multiple connectors, e.g. one each for power delivery and communications. In such examples, each such connector can include the features of the connector 136 described herein.

The connector 136 is configured, when the device 100 is placed on the dock 112, to engage with a complementary connector 140 of the device 100 to establish data communications and/or power delivery with the device 100. For example, the connector 136 can be configured to provide a communications link with the device 100 based on the Universal Serial Bus (USB) 3 standard.

Certain types of connections between the dock 112 and the device 100, including the USB 3 link mentioned above, may generated sufficient electrical noise to interfere with other hardware elements of the device 100 or the dock 112. For example, noise from the connector 136 (and the connector 140) may interfere with the operation of a Global Positioning System (GPS) receiver of the dock 112 or the device 100. Connectors may be shielded to mitigate such interference, for example by surrounding at least the connector 136 with a conductive material such as a sheet of metal.

The above shielding mechanism, however, may impede ingress protection mechanisms implemented by the dock 112 and the device 100. Such ingress protection mechanisms seek to prevent entry of water and/or dust into the connectors 136 and 140, but metal sheets typically do not form effective seals against other surfaces. The connector 136 therefore includes certain features to reduce electrical noise generated by communications and/or power delivery between the dock 112 and the device 100, while also providing ingress protection at the connectors 136 and 140.

Figure 2:
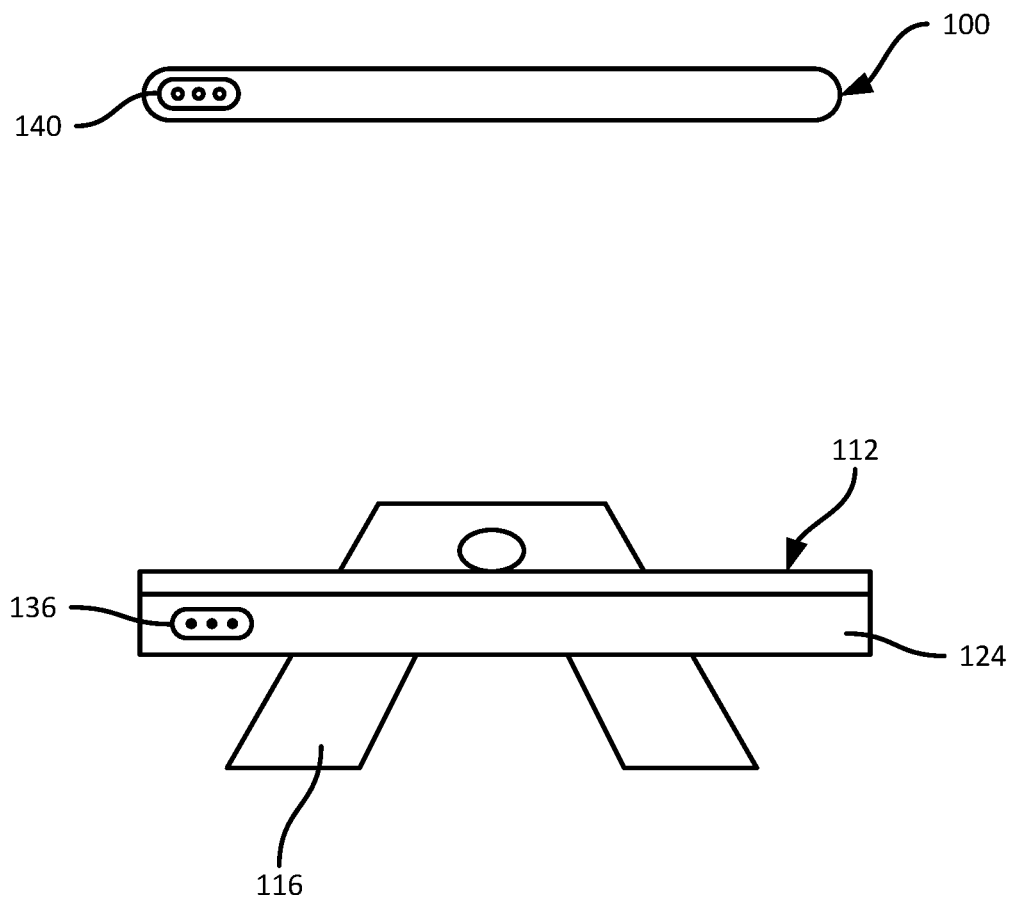
FIG. 2 is a diagram of a top view of the dock of FIG. 1, and a bottom view of the mobile device of FIG. 1.

FIG. 2 illustrates a top view of the dock 112, and a bottom view of the device 100, to further illustrate the connectors 136 and 140. Although the specific format of each connector 136 and 140 may vary depending on the capabilities provided by the connectors 136 and 140, in general the connectors 136 and 140 include complementary electrical contacts configured to engage in order to connect certain internal components of the dock 112 with certain internal components of the device 100. In this example, the connector 136 includes a set of pins (e.g. pogo pins) and the connector 140 includes a corresponding set of contacts (e.g. a set of further pins, a set of conductive pads, or the like) configured to receive and/or engage with the pins of the connector 136.

Figure 3:
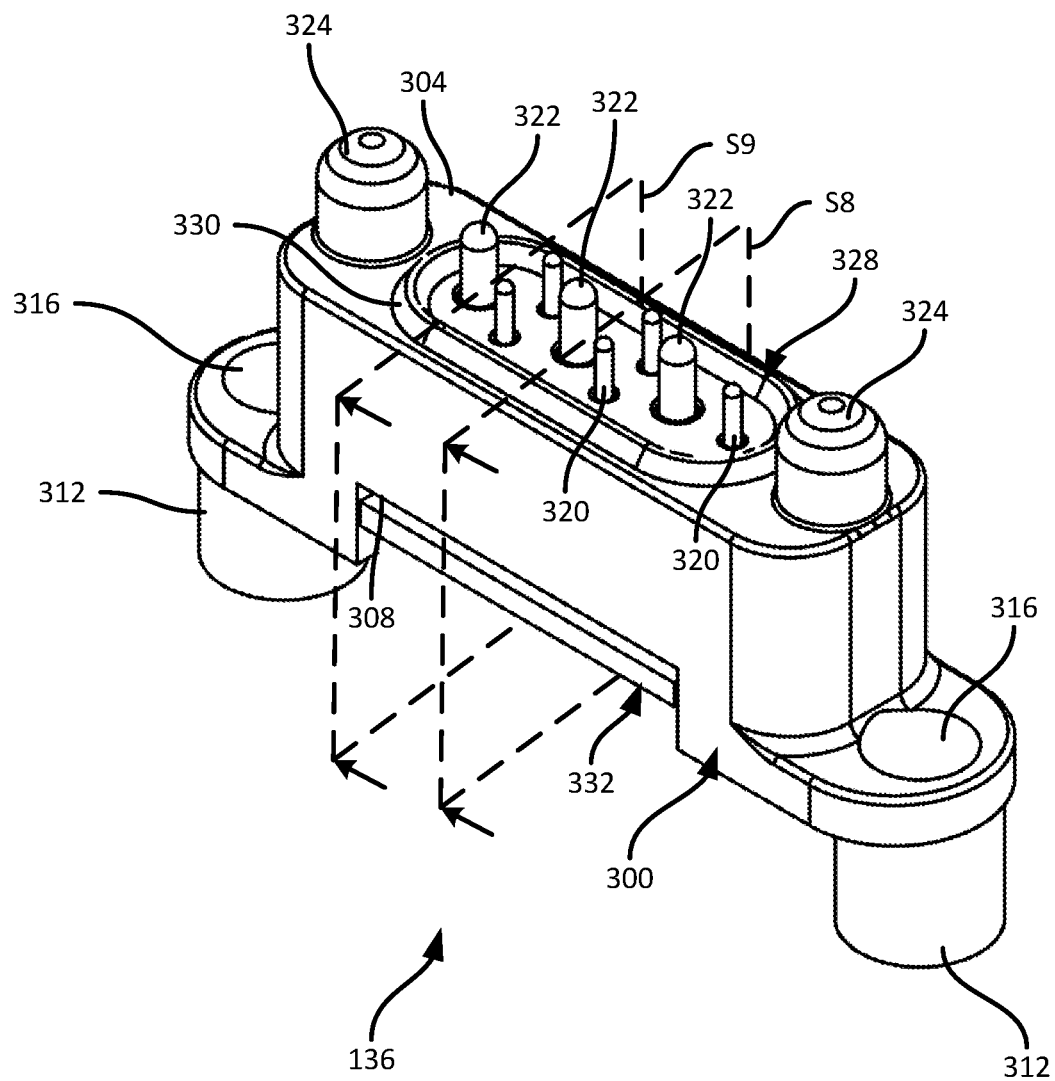
FIG. 3 is an isometric view of the connector of the dock of FIG. 1, viewed from above.

Turning to FIG. 3, the connector 136 is shown in isolation. The connector 136 includes a connector body 300 with an outer end 304 and an opposing inner end 308. The outer end 304 is referred to as "outer" because it is exposed to the exterior of the housing 120 of the dock, and is configured to engage with the device 100. The inner end 308, on the other hand, is referred to as "inner" because it is disposed within an interior of the housing 120. More specifically, in this example the connector 136 is mounted within an opening in the surface 124 of the housing 120, such that the outer end 304 is outside the housing 120 and the inner end 308 is within the housing 120. The connector 136 can be affixed to the housing 120 by fasteners (e.g. bolts or screws) inserted into the housing through bearing guides 312 extending from the inner end 308 and defining openings 316 therethrough.

The connector 136 also includes at least one signal conductor 320 extending between the inner end 308 and the outer end 304, as well as at least one ground conductor pin 322 extending between the inner end 308 and the outer end 304. In the illustrated example, the signal conductor 320 is implemented as a set of pins, such as pogo pins, that extend through the connector body 300 and protrude from the outer end 304, to engage with complementary structures on the connector 140 of the device 100. For example, the signal conductor pins 320 in the illustrated embodiment include two pairs of signal conductor pins, e.g. a first pair for upload and a second pair for download, to implement a USB3 connection. A fifth signal conductor pin 320 is also provided in this example, allowing the 112 to detect the presence of the device 100. The connector body 300 can also include alignment posts 324 extending outwards from the outer end 304, to engage with complementary structures on the housing 104 of the device 100.

To shield other components (such as the GPS receiver mentioned earlier) from electrical noise generated by communications between the device 100 and the dock 112 via the connector 136, the connector 136 also includes a conductive, resiliently deformable sleeve 328. The sleeve 328, as will be discussed in greater detail below, extends the length of the signal conductor(s) 320, between the inner end 308 and the outer end 304. Thus, the sleeve 328 forms an electrically isolating shield that substantially encloses the signal conductor(s) 320 and ground conductor(s) 322 from the inner end 308 to the outer end 304. The sleeve 328 is said to "substantially" enclose the conductors 320 and 322 because, although the sleeve 328 may include openings therethrough and therefore not completely enclose the conductor 320, the sleeve encloses the conductors 320 and 322 over at least a certain portion of a length of the conductors 320 and 322 (defined by a distance between the inner end 308 and the outer end 304). That portion may be, for example, about 80% or greater.

In addition to shielding other components from electrical noise generated by the conductors 320 and 322, the sleeve 328 also provides ingress protection to the connector 136, mitigating the entry of dust and/or fluid between the device 100 and the outer end 304 of the connector 136, where such dust and/or fluid may contact the conductors 320 and 322, and interfere with operation of the device 100 and the dock 112. To that end, the sleeve 328 is resiliently deformable, such that the sleeve 328 can compress against the connector 140 of the device 100 or a surface of the device 100 surrounding the connector 140 to form the above-mentioned seal.

As shown in FIG. 3, the sleeve 328 protrudes outwards from the outer end 304 to form a raised rim 330 around the signal conductor(s) 320. The rim 330 contacts the device 100 when the device 100 is docked, and deforms to seal against an outer surface of the device 100. The sleeve 328 is sufficiently resilient that the above deformation is elastic, such that the sleeve 328 returns to a resting state (as illustrated in FIG. 3) when the device 100 is undocked. The sleeve 328 can therefore be fabricated from a flexible, conductive material, such as a conductive rubber. The connector body 300, meanwhile, may be fabricated from a material with a greater stiffness than the sleeve 328, such as a comparatively stiffer plastic, a ceramic, a metal, or the like. The material used for the sleeve 328, such as the above-mentioned conductive rubber, may also absorb electromagnetic signals to mitigate the impact of electrical noise on other components such as GPS receivers and network transceivers (e.g. WiFi and/or cellular transceivers).

The connector 136 can also include an interface assembly 332 coupled thereto at the inner end 308. The assembly 332, as will be discussed below, is configured to interconnect the conductors 320 and 322 with internal components of the dock 112 such as the communications interface 132. In some examples, the assembly 332 is also configured to provide a ground connection to the sleeve 328.

Figure 4:
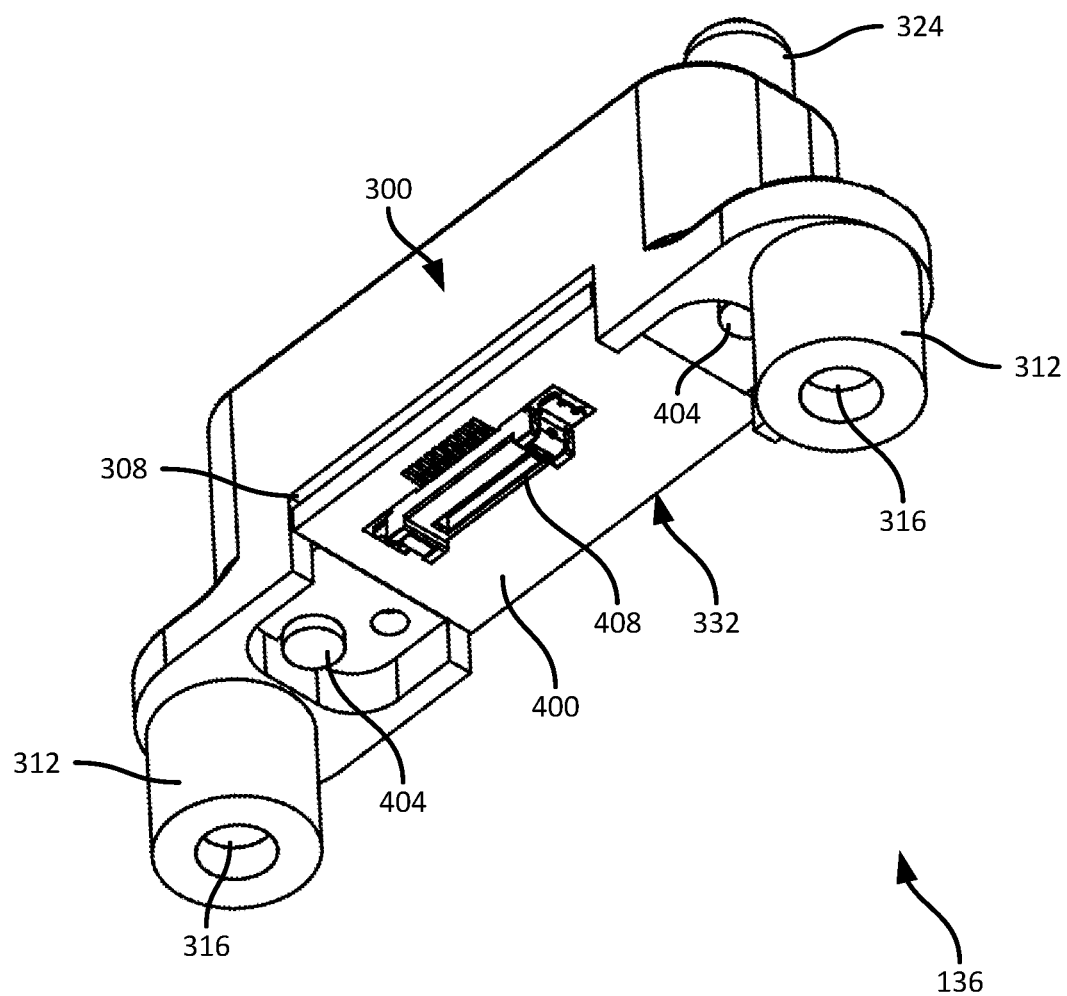
FIG. 4 is an isometric view of the connector of the dock of FIG. 1, viewed from below.

Turning to FIG. 4, the connector 136 is shown from below (i.e. facing the inner end 308), revealing the assembly 332 in greater detail. The assembly 332, in this example, includes a circuit support 400, such as a printed circuit board (PCB) affixed to the inner end 308 of the connector body 300, e.g. via one or more fasteners 404. The support 400 carries components such as an interface 408 configured to connect to internal components of the dock 112, e.g. via a port, cable or the like. The interface 408 is electrically connected, e.g. via circuit traces, contact pads and the like of the support 400, to the signal conductor(s) 320.

Figure 5:
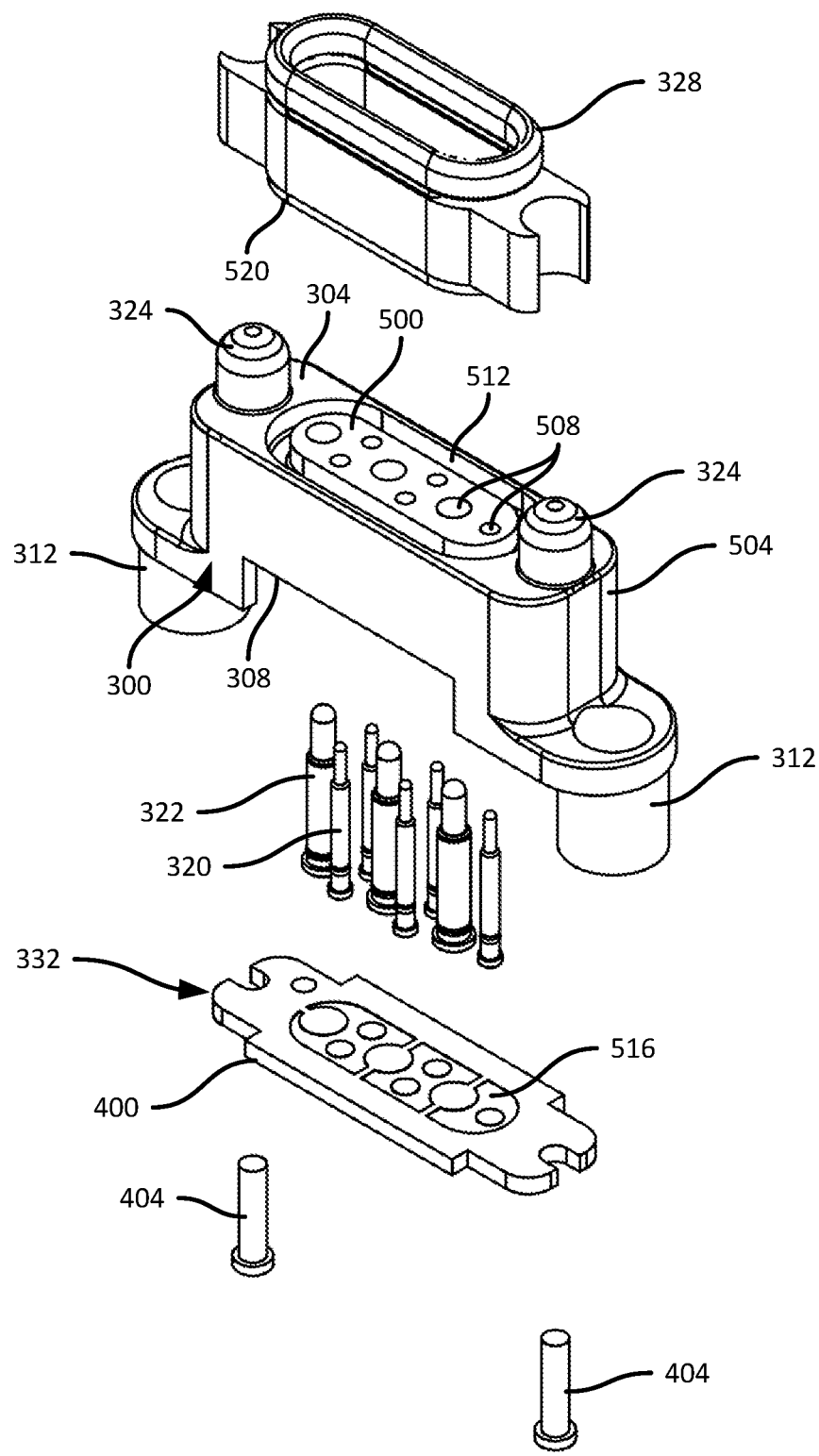
FIG. 5 is an exploded view of the connector of FIG. 3.

FIG. 5 illustrates an exploded view of the connector 136 is shown, in which the conductors 320 and 322 are withdrawn from the connector body 300, and the assembly 332 is removed from the inner end 308 of the connector body 300. Additional structural features of the connector body 300 and the sleeve 328 are also visible in FIG. 5. In particular, the connector body 300 includes a central portion 500, and a peripheral portion 504. The central portion 500 includes apertures 508 to receive the signal conductor(s) 320, while the peripheral portion 504 includes the bearing guides 312 and alignment posts 324. The peripheral portion 504 also supports the assembly 332, and engages with the above-mentioned opening in the housing 120 of the dock 112 when the connector 136 is installed.

The central portion 500 and the peripheral portion 504 of the connector body 300 are separated by a channel 512, and the sleeve 328 is disposed in the channel 512 when the connector 136 is assembled. As seen in FIG. 5, the sleeve 328 defines a substantially continuous annular (elongated in this case to accommodate the shape of the connector 136) shape that, when placed in the channel 512, substantially encircles the signal conductor(s) 320.

As also seen in FIG. 5, a side of the support 400 facing the inner end 308 of the connector body 300 includes electrical contacts such as circuit traces 516, to connect to the signal conductor(s) 320. The support 400 can also include a ground trace to engage with an inner edge 520 of the sleeve 328, which is configured to protrude inwards from the channel 512 to contact the support 400.

Figure 6:
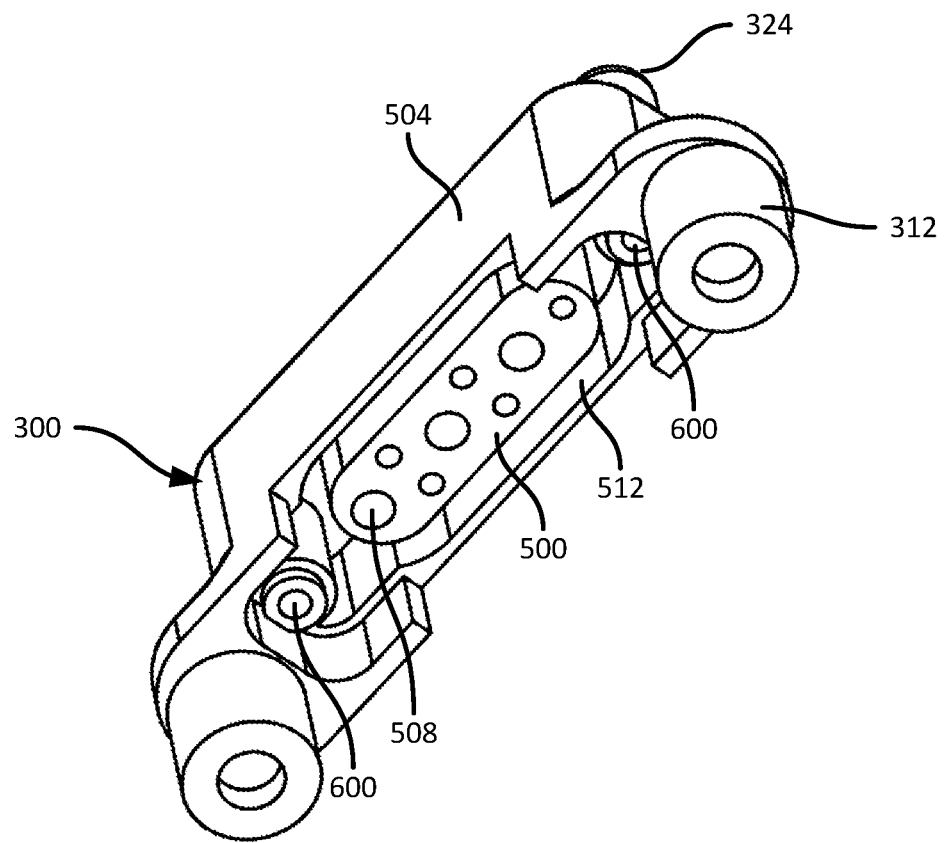
FIG. 6 is a diagram illustrating a connector body of the connector of FIG. 3, viewed from below.
Figure 6:
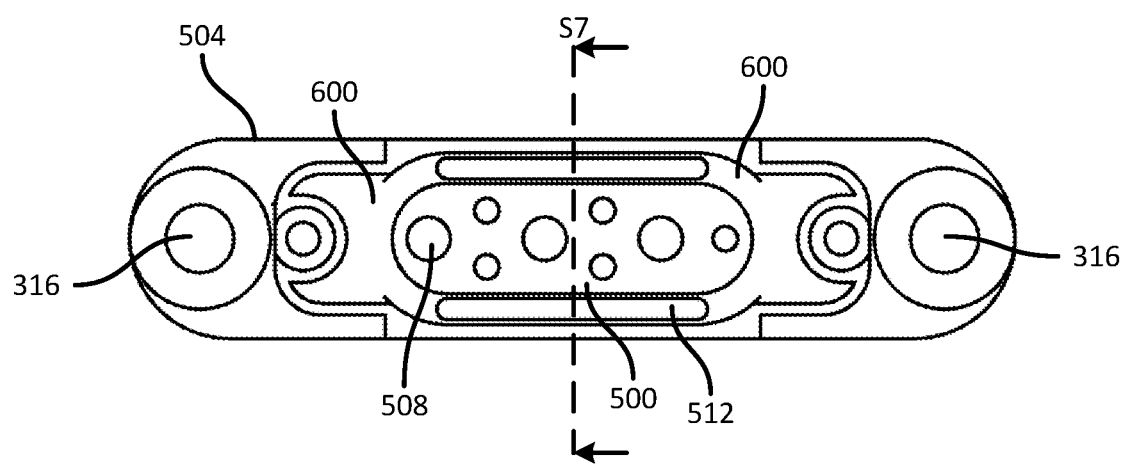

FIG. 6 illustrates the connector body 300 from below, in isolation. In addition to certain features of the connector body 300 mentioned earlier, a further portion of the channel 512 is visible in FIG. 5, as are apertures 508 in the central portion 504 for receiving the fasteners 404 to affix the assembly 332 to the connector body 300. In addition, the mechanism by which the central portion 500 is coupled to the peripheral portion 504 is illustrated in FIG. 6. While in some examples, the central portion 500 and the peripheral portion 504 may be manufactured separately and joined only once the sleeve 328 is installed (e.g. via adhesive), in the illustrated example, the connector body 300 is structured to allow manufacture of the connector body 300 in a single mold shot.

In particular, the central portion 500 is joined to the peripheral portion 504 by at least one strut 600 (two struts are used in the illustrated example) traversing channel 512. The struts interrupt the channel 512, but do not extend along the full length of the channel 512 (that is, from the inner end 308 to the outer end 304). Thus, on either side of the struts 600 (i.e. between the struts 600 and the outer end 304, and between the struts 600 and the inner end 308), the sleeve 328 entirely surrounds the central portion 500.

Figure 7:
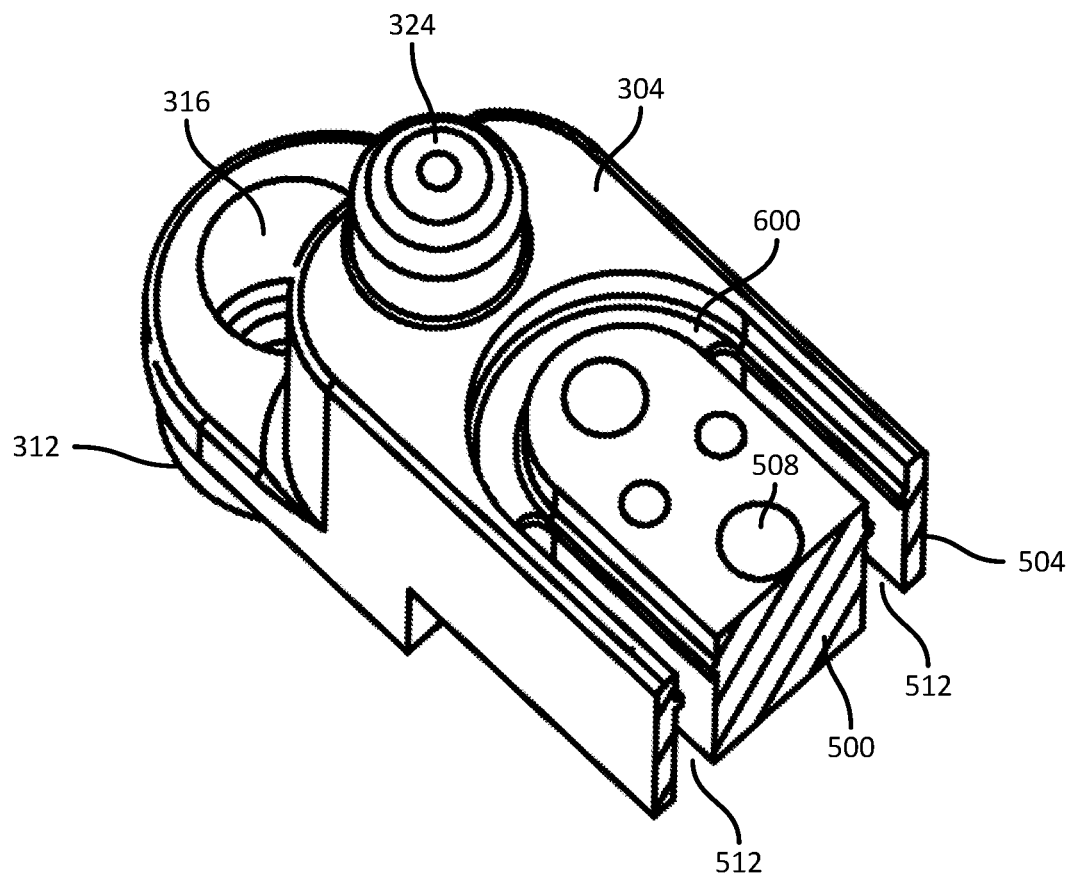
FIG. 7 is a cross sectional view of the connector body of FIG. 6, taken at the line S6.

FIG. 7 illustrates a cross section of the connector body 300, taken at the section line S7 shown in FIG. 6. As seen in FIG. 7, the channel 512 substantially surrounds the central portion 500, but is interrupted by the strut 600 near the outer end 304 (i.e. closer to the outer end 304 than to the inner end 308, although the position of the struts 600 within the channel 512 need not be as shown).

Figure 8:
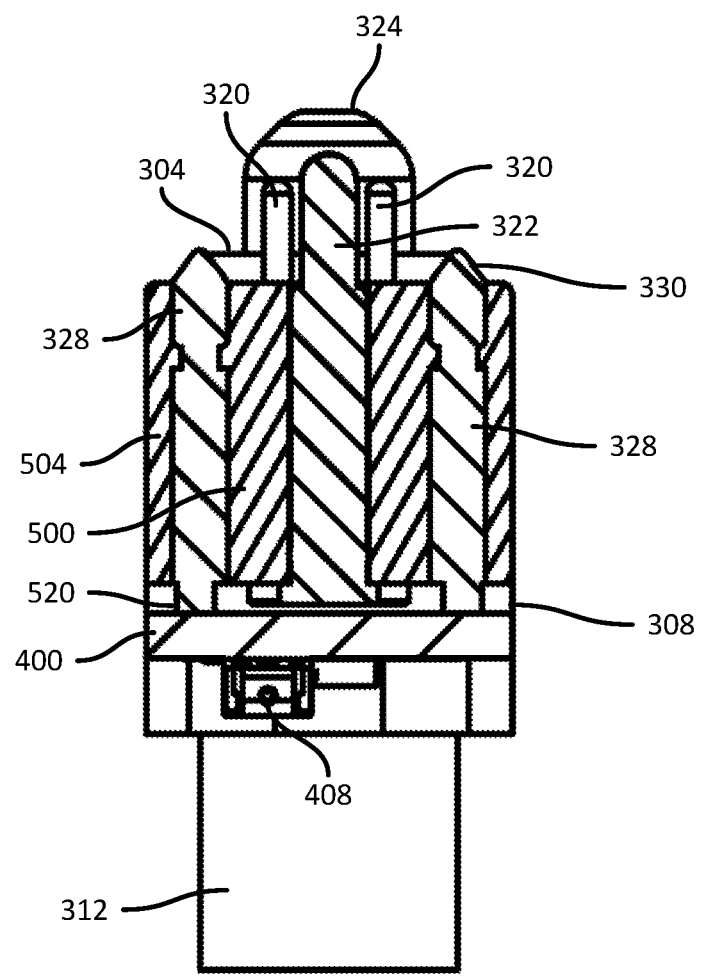
FIG. 8 is a cross sectional view of the connector of FIG. 3, taken at the plane S8.
Figure 9:
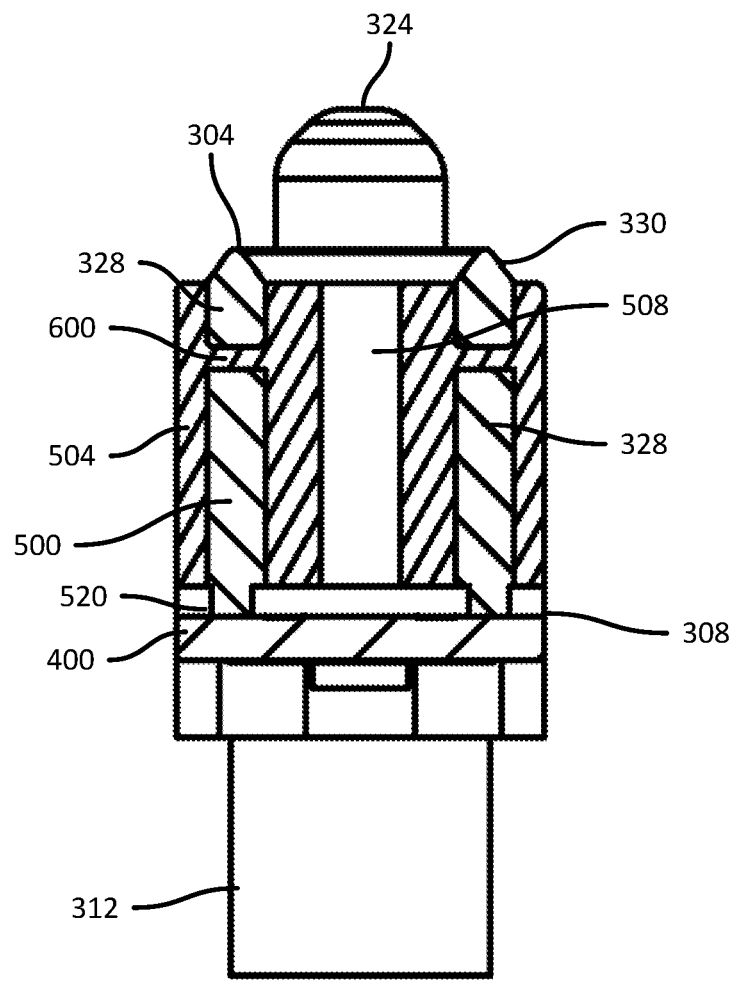
FIG. 9 is a cross sectional view of the connector of FIG. 3, taken at the plane S9.

The structure of the sleeve 328 and channel 512 is further illustrated in FIGS. 8 and 9, which illustrate cross sections of the connector 136 taken at the planes S8 and S9, respectively, as indicated in FIG. 3 (FIG. 9, however, omits a signal conductor 320 to illustrate an aperture 508). In particular, FIG. 8 illustrates that in between the struts 600, the channel 512 extends continuously between the inner end 308 and the outer end 304 of the connector body 300. The sleeve 328 therefore completely encircles the signal conductor(s) 320.

As seen in FIG. 9, however, closer to one side of the connector body 300 (i.e. towards the bearing guide 312), the strut 600 interrupts the channel 512 and therefore the sleeve 328. Thus, for a small portion of the length of the channel 512 (in this case, less than about 10% of the channel length), the signal conductor(s) 320 are not fully surrounded by the sleeve 328.

Figure 10:
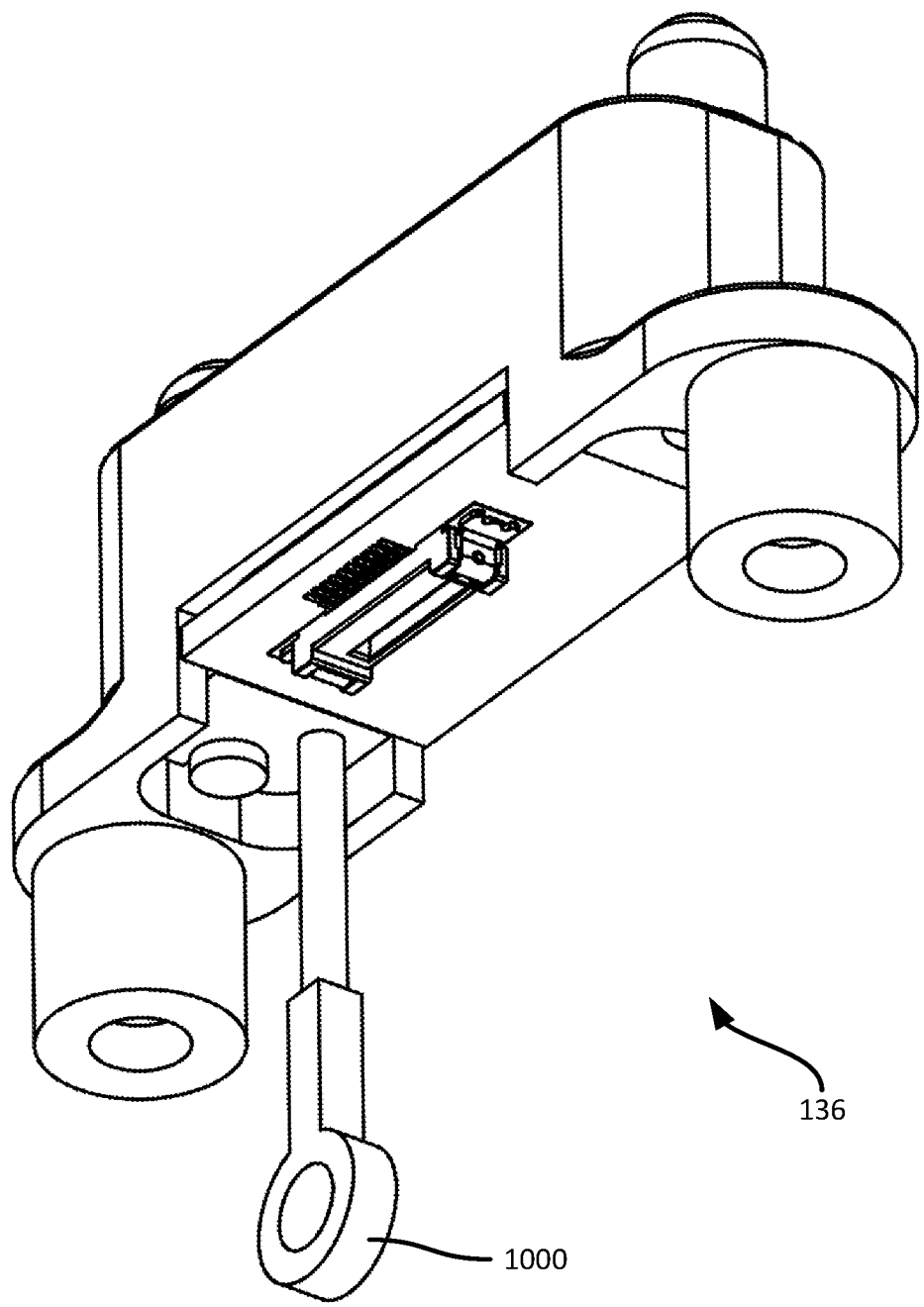
FIG. 10 is an isometric view of the connector of the dock of FIG. 1, viewed from below and including a ground pin.

As noted earlier, the support 400 can include a ground trace. As shown in FIGS. 8 and 9, in addition to protruding outwards from the outer end 304, the sleeve 328 protrudes inwards from the inner end 308, to contact the support 400. Specifically, the inner edge 520 of the sleeve 328 engages with the ground trace on the support 400 when the connector 136 is assembled. Further, as shown in FIG. 10, the connector 136 can include a ground cable and lug 1000 inserted into or through the support 400 to connect to the above-mentioned ground trace and thereby connect the ground trace and the sleeve 328 to ground circuit in the dock 112.

Figure 11:
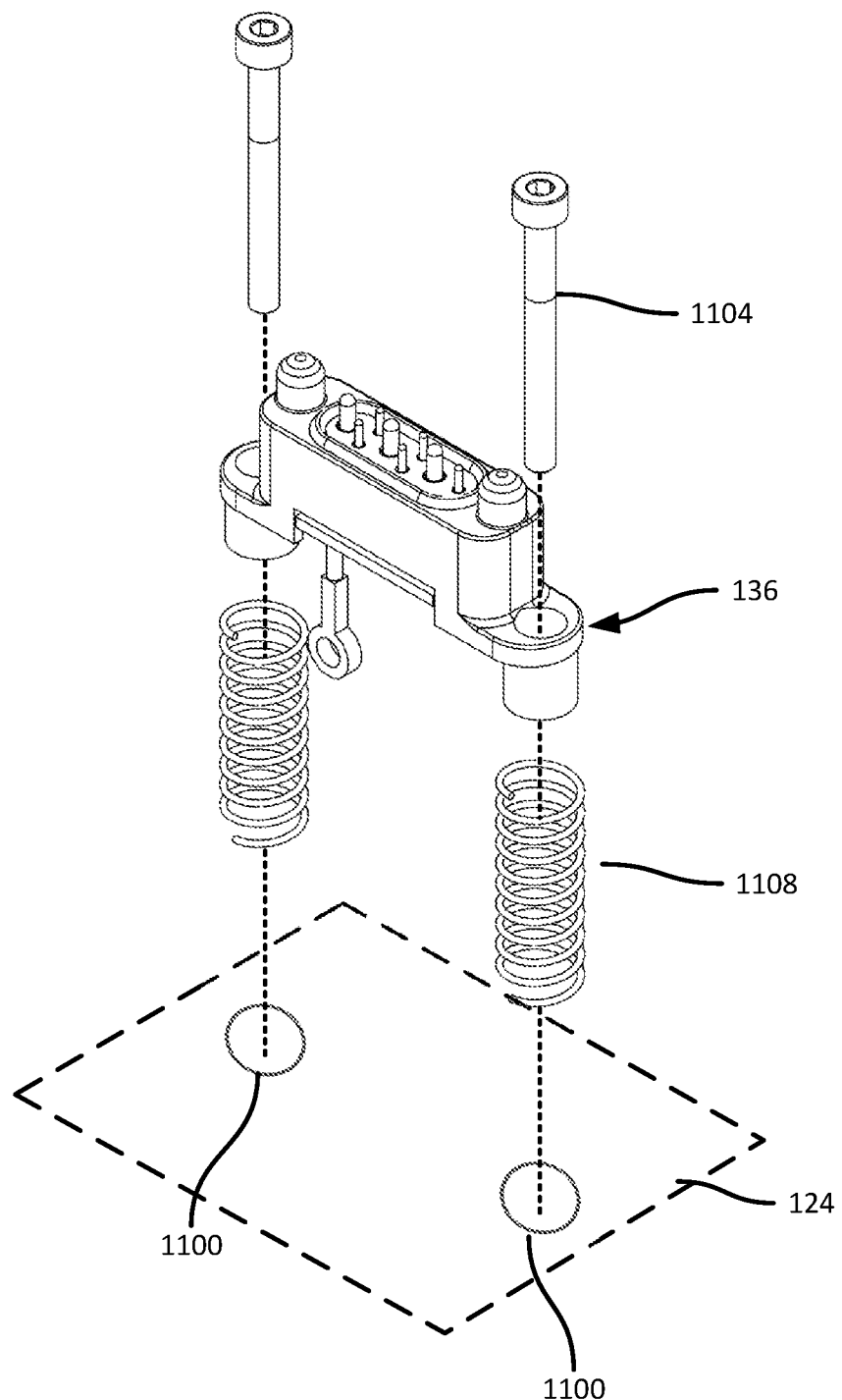
FIG. 11 is an exploded view of the connector of FIG. 3 illustrating a mechanism for installing the connector in the dock of FIG. 1.

FIG. 11 illustrates an example mechanism for coupling the connector 136 to the dock 112. As shown in FIG. 11, the support surface 124 includes openings 1100 therein, configured to receive fasteners 1104 and corresponding bias members 1108 (e.g. coil springs) therein. The fasteners 1104 and springs 1108 both retain the connector 136 against or within the support surface 124 (e.g. via a further opening in the support surface 124 shaped to accommodate the connector 136), and also move with the device 100. Such movement allows the connector 136 to remain in consistent contact with the device 100 in the presence of vibration, impact or the like.

Figure 12:
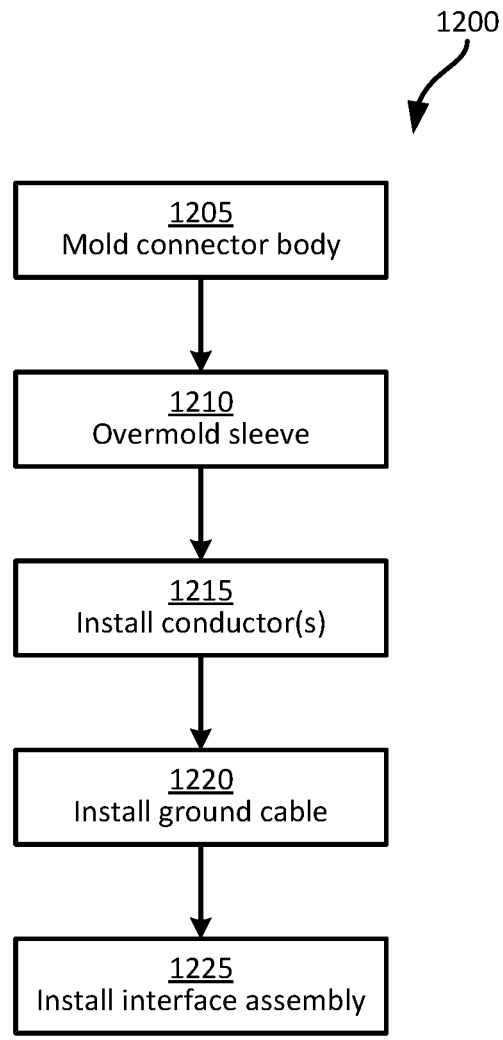
FIG. 12 is a flowchart of a method of manufacturing the connector of FIG. 3.

Turning to FIG. 12, a flowchart of a method 1200 of manufacturing the connector 136 is shown. At block 1205, in a first molding operation, the connector body 300 is fabricated, e.g. out of a rigid plastic or other suitable material. At block 1210, in a second molding operation, the sleeve 328 is overmolded on the connector body 300. The connector body 300 and the sleeve 328, in other words, can be manufactured in a two-shot molding operation, simplifying manufacturing and assembly of the connector 136.

At block 1215, once the connector body 300 and sleeve 328 are fabricated, the conductors 320 and 322 are inserted into the apertures 508. At block 1220, the ground cable and lug 1000, if used, is installed. For example, the ground cable and lug 1000 may be soldered to the support 400. At block 1225, the interface assembly 332 is affixed to the connector body 300, e.g. via the fasteners 404. The interface assembly 332 may then be soldered via a reflow mechanism to ensure robust connectivity between the conductors 320 and 322 and the support 400.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A connector, comprising
   a connector body having an outer end and an opposing inner end, the connector body supported by a housing of a first device, wherein the outer end is exposed to an exterior of the housing and the inner end is placed within an interior of the housing;
   a signal conductor extending between the inner end and the outer end to engage with a complementary connector of a second device;
   a conductive resiliently deformable sleeve extending between the inner end and the outer end of the connector body, wherein the conductive resiliently deformable sleeve: (i) defines an electrically isolating shield that substantially encloses the signal conductor from the inner end to the outer end, and (ii) forms a seal against the second device encircling the signal conductor and the complementary connector,
   wherein,
      the connector body includes a central portion configured to support the signal conductor, and a peripheral portion configured for support by the housing of the first device,
      the connector includes a channel defined between the central portion and the peripheral portion, and
      the resiliently deformable sleeve occupies the channel.

2. The connector of claim 1, wherein the connector is a data connector.

3. The connector of claim 1, wherein the connector includes a grounding element connected to the sleeve.

4. The connector of claim 1, wherein the central portion includes an aperture therethrough to receive the signal conductor.

5. The connector of claim 1, wherein the central portion is affixed to the peripheral portion by a strut extending across a portion of the channel.

6. The connector of claim 1, wherein the signal conductor includes a pogo pin.

7. The connector of claim 1, wherein the sleeve extends outwards beyond the outer end to form the seal by compressing against the complementary connector.

8. The connector of claim 1, wherein the sleeve is made of conductive rubber.

9. The connector of claim 1, wherein the outer end of the connector body is affixed in an opening of the housing of the first device.

10. The connector of claim 9, wherein the first device is a dock for a mobile computing device.

11. The connector of claim 1, further comprising:
    an interface assembly having (i) a support member, (ii) an electrical contact on a first side of the support member to engage with the signal conductor, and (iii) an interface on an opposite second side of the support member.

12. The connector of claim 11, wherein the interface assembly includes a ground contact on the first side to engage with the sleeve.

13. A dock for a mobile device, the dock comprising:
    a housing configured to support the mobile device, and having an engagement surface to engage with an outer surface of the mobile device;
    a connector disposed on the engagement surface, the connector including:
       a connector body having an outer end and an opposing inner end, the connector body supported by the housing, wherein the outer end is exposed to an exterior of the housing and the inner end is placed within an interior of the housing;
       a signal conductor extending between the inner end and the outer end to engage with a complementary connector of the mobile device supported by the dock;
       a conductive resiliently deformable sleeve extending between the inner end and the outer end of the connector body, wherein the conductive resiliently deformable sleeve: (i) defines an electrically isolating shield that substantially encloses the signal conductor from the inner end to the outer end, and (ii) forms a seal against the mobile device encircling the signal conductor and the complementary connector.

14. The dock of claim 13, wherein the housing includes an opening in the engagement surface; and wherein the connector is disposed within the opening.

15. The dock of claim 13, wherein the housing contains a power supply coupled to the connector, to deliver power to the mobile device.

16. The dock of claim 13, wherein the housing contains a communications interface coupled to the connector.

17. The dock of claim 16, wherein the communications interface enables Universal Serial Bus (USB) 3 communication with the mobile device.

18. A method of manufacturing a connector, comprising:
    in a first molding operation, fabricating a connector body of a first material and having an outer end and an opposing inner end, the connector body configured for support by a housing of a first device to (i) expose the outer end to an exterior of the housing, and (ii) place the inner end within an interior of the housing;
    in a second molding operation, overmolding the connector body with a conductive, resiliently deformable sleeve extending between the inner end and the outer end of the connector body; and
    installing a signal conductor in the connector body, the signal conductor extending between the inner end and the outer end, and substantially enclosed within an electrically isolating shield formed by the sleeve.

19. The method of claim 18, further comprising:
    affixing an interface assembly at the inner end of the connector body, the interface assembly including a contact to engage with the signal conductor on a first side, and an interface on a second side.

* * * * *